United States Patent [19]

Rubin

[11] Patent Number: 4,961,936

[45] Date of Patent: Oct. 9, 1990

[54] PROCESS FOR PREPARATION OF OIL-FREE FISH MEAL AND RECOVERY OF POLYUNSATURATED FATTY ACIDS

[75] Inventor: David Rubin, San Diego, Calif.

[73] Assignee: Century Laboratories, Inc., Port Washington, N.Y.

[21] Appl. No.: 43,458

[22] Filed: Apr. 28, 1987

[51] Int. Cl.$^5$ .................................................. A23J 1/04
[52] U.S. Cl. ........................................ 426/7; 426/643; 260/412.1; 260/425
[58] Field of Search ............... 210/669, 663, 685, 692; 426/643, 417, 657, 56, 59, 7; 260/412.1, 425

[56] References Cited

U.S. PATENT DOCUMENTS

| | | |
|---|---|---|
| 28,903 | 7/1876 | Aneja et al. . |
| 353,822 | 12/1886 | Sahlstrom . |
| 438,349 | 11/1895 | Ward .................................. 260/412.1 |
| 547,548 | 10/1895 | Herwig . |
| 1,903,503 | 4/1933 | Conn . |
| 2,512,375 | 6/1950 | Parfentjev ............................ 426/657 |
| 2,589,287 | 3/1952 | Ryan ..................................... 426/657 |
| 2,614,110 | 10/1952 | Davis ................................. 260/412.1 |
| 2,651,647 | 9/1953 | Greenfield ........................ 260/412.1 |
| 2,686,126 | 8/1954 | Lovern ................................. 260/425 |
| 2,717,835 | 9/1955 | Brody ................................ 260/412.1 |
| 2,875,061 | 2/1959 | Vogel . |
| 2,934,433 | 4/1960 | Brocklesby ......................... 426/657 |
| 3,041,174 | 6/1962 | Ehlert ............................... 260/412.1 |
| 3,493,385 | 2/1970 | Hack ................................... 426/657 |
| 3,499,017 | 3/1970 | Davis . |
| 3,576,831 | 4/1971 | Davis . |
| 3,580,725 | 5/1971 | Kuster ................................. 426/657 |
| 3,697,285 | 10/1972 | Faith, Jr. . |
| 3,836,686 | 9/1974 | Roels . |
| 3,959,518 | 5/1976 | Vincent .............................. 426/643 |
| 4,060,642 | 11/1977 | Suzuki . |
| 4,136,204 | 1/1979 | Hughes et al. ....................... 426/643 |
| 4,207,344 | 6/1980 | Cerrillo .............................. 426/643 |
| 4,240,972 | 12/1980 | Mag . |
| 4,340,612 | 7/1982 | Askman et al. ...................... 426/657 |
| 4,405,649 | 9/1983 | Jeffreys et al. . |
| 4,584,141 | 4/1986 | Paulitz et al. . |
| 4,623,488 | 11/1986 | Takao . |

FOREIGN PATENT DOCUMENTS

| | | | |
|---|---|---|---|
| 46-1774 | 6/1971 | Japan .................................. 426/657 |
| 1009400 | 4/1983 | U.S.S.R. ............................. 426/657 |
| 926453 | 5/1963 | United Kingdom ................ 426/643 |

OTHER PUBLICATIONS

Shewfelt 1981 Effect of Phospholipid Hydrolysis on Lipid Oxidation in Flounder Muscle Microsomes, J. Food Science 46:1297.

Quaglia, G. B. et al. "Preparation and Properties of Enzymic Proteolyzales from Byproducts of the Tuna in Oil Industry" Chemical Abstract 98-70514, vol. 98, 1983.

*Primary Examiner*—Carolyn Paden
*Attorney, Agent, or Firm*—Browdy and Neimark

[57] ABSTRACT

A process for obtaining fish meal which is essentially free of oil, as well as recovering valuable free polyunsaturated fatty acids, comprising hydrolyzing membrane phospholipids in comminuted fish with aqueous alkali solution, at a temperature which is not substantially above ambient, adding a strong acid to release free polyunsaturated fatty acids, recovering the free fatty acids from the aqueous phase by mechanical separation, and drying the aqueous phase.

19 Claims, No Drawings

PROCESS FOR PREPARATION OF OIL-FREE FISH MEAL AND RECOVERY OF POLYUNSATURATED FATTY ACIDS

FIELD OF THE INVENTION

The present invention relates to a process for obtaining a high-protein meal from fish that can be used as food, fodder, and for other nutritional purposes.

BACKGROUND OF THE INVENTION

Fish meal is an excellent source of protein, and as such has been considered for use as an additive to feed for animals, such as chickens. There is an abundant source of fish for use in making fish meal, as there are often many trash fish caught which are considered unsuitable for human consumption, or only certain parts of the fish are recovered for human use, with the remainder being discarded. This is true for herring, which are caught principally for their roe, the herring in excess of that which can readily be marketed being discarded.

The unusable or unused fish cannot be returned to the sea because dumping of this fish over the side of a vessel may scare away other fish, making the fishing grounds unsuitable for future use. Another problem with disposal of the unused fish is the significant odor, and consequently environmental, problem of dead fish.

Unfortunately, currently available fish meal, even after all of the fish oil has been removed from the adipose tissues by conventional techniques, still contains a significant amount, up to about 5%, of oil. This oil is contained in the cell membranes of the fish meal, mainly as phospholipids. Some of this oil is in the form of polyunsaturated fatty acids, which are extremely vulnerable to oxidation at ambient conditions. The oxidation products of these free polyunsaturated fatty acids contribute to the unpleasant taste and odor of fish meal. Because of this unpleasant taste and odor, such fish meal, which would otherwise be an excellent source of protein as a supplement in food for human consumption or in animal feed, has been substantially eliminated from this market. Furthermore, these oxidized free fatty acids, when present in chicken feed, for example, impart a fishy odor to the chickens themselves and to the eggs that they lay. Additionally, it is known that the consumption of the oxidized products of free fatty acids can cause neurological damage. Great quantities of vitamin E must be added to the fish meal in order to offset the effect of these oxidation products and to decrease to some extent the neurological damage that can be done in order for it to be used as fodder. For these reasons, chicken feed, for example, currently can contain only up to about 5% of fish meal, mixed in with other traditional ingredients of chicken feed such as corn, etc.

Traditionally, fish meal has been prepared by any of various processes such as extracting oil from comminuted fish by cooking the fish to render the oil, extracting the oil with organic solvents, or extracting by cold pressing the fish under pressure or centrifuge, to separate the oil in an organic phase from the proteins in the aqueous phase. These processes do not remove all of the oil from the fish. While they may remove all of the oil readily available in the adipose tissues, they will not remove the oil which is bound to the cell membranes in the form of membrane phospholipids. The cell membranes contain up to 5% of the total fish oil in the form of membrane phospholipids. This amount of oil, which cannot be removed by the above-mentioned methods, is sufficient to make the fish meal substantially unsuitable for use as a protein supplement. The high percentage of polyunsaturated fatty acids, particularly omega-3-polyunsaturated fatty acids such as EPA and DHA, occurring in the membrane phospholipids, while valuable as nutritional supplements, are very vulnerable to oxidation, thus rendering the fish meal unsuitable for use as a source of protein and difficult to dispose of.

Many methods for removing oil from fish or fish meal have been proposed in the prior art. However, none of these methods specifically address the problem of oils present in membrane phospholipids, and many of these processes subject the fish to extremes of temperature that may cause formation of undesirable by-products. Among the problems encountered in subjecting fish to elevated temperatures is that the elevated temperatures may cause rancidity, and thus undesirable odors, of the fatty acids present therein. Additionally, particularly in view of the presence of decarboxylase enzymes in the cells themselves, amino acids present in the fish may be decarboxylated to amines, many of which have disgusting odors.

Vogel et al., in U.S. Pat. No. 2,875,061, disclose a process for preparing protein products from fish materials wherein raw fish are first subjected to fat extraction by an organic solvent and then heated in a solution of alkali hydroxide in ethanol to remove fishy taste and smell from the fish material. The process of this patent does not involve conditions which will inherently hydrolyze phospholipids. Furthermore, there is no provision to recover any valuable free polyunsaturated fatty acids.

Roels, U.S. Pat. No. 3,836,686, teaches a process for recovering a protein hydrolysate having an oil concentration of less than 0.15% from whole fish or fish products by digesting a homogenized slurry of the fish at elevated temperature in an acid medium at a pH of about 1 and separating and purifying the aqueous phase of the digestion step. This high temperature acid treatment provides undesirable side effects in that the amino acids become decarboxylated to amines which have undesirable smell and a moderate degree of toxicity.

Danish patent No. 141,922 extracts oil and protein material from fish or fish entrails or livers by mixing with sulfuric acid to a ph of 1.2 to 2.2 and maintaining at 40° C. for 1 to 4 days and then neutralizing and centrifuging to obtain three fractions, fats, a protein hydrolysate and a sludge. The conditions of this process are not sufficient to hydrolyze cell membrane phospholipids.

European patent No. 169,166 discloses a method of hydrolysis of animal or vegetable proteins by treatment with gaseous hydrochloric acid. The intent of this patent is ony to hydrolyze the proteins and there is no disclosure of hydrolyzing phospholipids in order to remove all fatty acids.

Suzuki, in U.S. Pat. No. 4,060,642, discloses a method for making a concentrated food product from the meat of marine animals by adding to the marine animal meat an edible salt to adjust the pH to about 6.5–7.7, and removing fats and water by use of a hydrophilic organic solvent.

Faith et al., in U.S. Pat. No. 3,607,285, disclose a process for solubilizing and extracting protein from fish, fish products, or fish parts by treating the fish with alkaline bacterial protease. This enzyme works on the protein and not on membrane phospholipids.

Conn, in U.S. Pat. No. 1,903,503, discloses a process for extracting oil and moisture from fish press cake by treating the fish cake with petroleum ether or other volatile solvent and removing excess solvent with a vacuum pump.

Sahlstrom, in U.S. Pat. No. 353,822, discloses a process for making extracts from fish wherein the fish is treated with hypermanganic alkali and ammonia solution, and then centrifuged, to remove fat from the fish. The oil is then separated for special treatment, which treatment is not disclosed.

Herwig, in U.S. Pat. No. 547,548, discloses a process for preparing fish meal by heating comminuted fish under dry heat to cause part of the water in the tissue to be vaporized, thereby bursting the cell walls of the fish flesh to lay open juices. These juices are evaporated with heat, and the oil is removed by means of organic solvents. No means to remove oil from the phospholipids bound to the cell membranes is disclosed.

None of the prior art workers have recognized that a specifically non-oily fish meal cannot be obtained without liberating the oily material from the membranes of the fish flesh and that this oil must be liberated in a manner which does not cause degradation of the amino acids.

SUMMARY OF THE INVENTION

It is an object of the present invention to overcome the above-noted deficiencies in the prior art.

It is another object of the present invention to provide an improved method for obtaining fish meal which is substantially free of oil.

It is yet another object of the present invention to provide a process for obtaining valuable free polyunsaturated fatty acids from fish meal.

It is further object of the present invention to provide a process for obtaining fish meal essentially free of fatty acids without the use of organic solvents.

It is further object of the present invention to provide a process for obtaining fish meal essentially free of fatty acids without use of temperatures substantially above ambient.

According to the present invention, the membrane phospholipids are removed from fish by hydrolyzing the membrane phospholipids and separating the free polyunsaturated fatty acids from the proteins and bone material therein. The proteins in the fish meal may or may not be hydrolyzed during the process, as this hydrolysis does not affect the nutritional value of the proteins.

The fish meal is comminuted and, optionally, the easily extracted oil is removed, either by heating or by cold pressing. Cold pressing to remove the oil is preferred, so that any free fatty acids in the fish cell membranes are not oxidized.

After this, the fish meal is hydrolyzed, preferably with an aqueous alkaline material, such as potassium hydroxide, for a sufficient time to hydrolyze the membrane phospholipids. A suitable catalyst may be added to the mixture to enhance the reaction. The catalyst used must be acceptable for use in foods and animal feeds if the fish meal product is to be used in animal foods, such as chicken feed. A suitable catalyst is ethanol. Only a catalytic amount of ethanol is needed. One hour is generally sufficient to obtain hydrolysis of the membrane phospholipids in the fish.

A strong acid, such as sulfuric acid, is then added to release the free fatty acids, which float on top of the mixture. When the strong acid is sulfuric acid, an antioxidant such as ascorbic acid is added to the mixture to protect any sulfurcontaining amino acids from oxidation by the sulfuric acid. These free fatty acids, which are rich in EPA and DHA, are mechanically removed from the aqueous phase, generally by gravity separation.

The anion of the strong acid is then removed by any suitable means. If the acid is sulfuric acid, the anion may be removed by adding a soluble calcium salt, preferably calcium hydroxide, to the aqueous phase. The calcium salt forms an insoluble calcium salt with the sulfate of the sulfuric acid, which insoluble calcium sulfate precipitates out of the aqueous phase and is recovered. The formation of the insoluble calcium salt removes excess sulfate ions.

Excess potassium ions in the product can cause diarrhea in animals consuming this product, so that it is also necessary to remove the excess potassium ions. A small amount of perchloric acid, $HClO_4$, may be added to remove excess potassium as insoluble $KClO_4$. This $HClO_4$ can be added either after the sulfuric acid is added or after the free fatty acids have been recovered.

Alternatively, the aqueous phase can be passed through an appropriate ion exchange resin column to remove excess acid anions and/or base cations.

The slurry is then dried in vacuo to provide a superior powdered protein product which can be used in chicken feed and other animal food without danger of oxidation of fatty acids. The fish meal resulting from the process of the present invention contains less than 0.1% fatty acid.

The fish meal is preferably hydrolyzed with alkaline material because the alkaline material can be used at ambient temperature and pressure. Acid hydrolysis is not suitable for the process of the present invention because it requires that the process be conducted at elevated temperatures, which can affect the character of the fatty acids in the phospholipids and can result in decarboxylation of the amino acids to undesirable amines. Enzymatic hydrolysis is not commercially feasible because the phospholipases which are required for enzymatic hydrolysis of the membrane phospholipids are presently scarce and extremely expensive, as they must be recovered from snake venom. However, enzymatic hydrolysis is comprehended by the present invention as it is not necessary to use temperatures substantially above ambient.

The membrane phospholipids are an excellent source of a number of valuable polyunsaturated fatty acids, particularly DHA (22:6-omega-3) and EPA (20:5-omega-3). The following Table, taken from Ackman, R. G. "Fish Oil Composition" in "Objective Methods for Food Evaluation; Proceedings of a Symposium", pp. 103-131, 1974 (pub. 1976), at 110, shows the weight percentages of some fatty acids of special interest which can be found in membrane phospholipids of fish muscles.

TABLE

Weight percentages of Some Fatty Acids of Special Interest in Phospholipids of Fish Muscle

| Fatty Acid | Mackerel Canada | Cod U.K. | Herring Canada | Halibut U.K. | Rockfish U.S.A. |
|---|---|---|---|---|---|
| 14:0 | 0.5 | 0.5 | 1.8 | 0.4 | 0.5 |
| 16:0 | 20.4 | 20.6 | 21.4 | 17.2 | 20.0 |
| 18:0 | 7.4 | 4.2 | 3.2 | 6.7 | 5.5 |
| 16:1 | 1.8 | 1.6 | 4.6 | 1.5 | 2.4 |
| 18:1 | 9.2 | 10.1 | 13.0 | 7.1 | 8.9 |

TABLE-continued

Weight percentages of Some Fatty Acids of Special Interest in Phospholipids of Fish Muscle

| Fatty Acid | Mackerel Canada | Cod U.K. | Herring Canada | Halibut U.K. | Rockfish U.S.A. |
|---|---|---|---|---|---|
| 20:1 | 1.6 | 1.5 | 2.4 | ND | 0.6 |
| 22:1 | 1.0 | TRA | 1.0 | 1.0 | ND |
| 18:2ω6 | 1.6 | 0.8 | 0.9 | TRA | 0.6 |
| 18:3ω3 | 0.5 | TRA | 0.3 | ND | 0.2 |
| 18:4ω3 | 0.2 | 0.2 | 0.2 | ND | ND |
| 20:4ω6 | 1.7 | 2.9 | 1.4 | 3.4 | ND |
| 20:5ω3 | 10.7 | 14.6 | 12.2 | 8.1 | 9.1 |
| 22:5ω3 | 1.6 | 1.2 | 0.8 | TRA | ND |
| 22:6ω3 | 36.3 | 35.4 | 32.7 | 45.2 | 47.0 |
| Above Total | 94.5 | 93.6 | 96.5 | 99.6 | 94.8 |

These polyunsaturated fatty acids, particularly EPA and DHA, are valuable nutritional supplements, and can be recovered readily from the membrane phospholipids by the method of the present invention.

The method of the present invention is particularly valuable because it does not involve the use of organic solvents, which must be removed from the products in some manner, and does not involve the use of temperatures substantially above ambient temperatures, and preferably no temperature above about 40° C., which may adversely affect the polyunsaturated fatty acids. The process of the present invention enables one to obtain a substantially fat-free, odor-free fish meal as well as free polyunsaturated fatty acids that can be used as they are recovered from the process as nutritional supplements or the like.

DETAILED DESCRIPTION OF PREFERRED EMBODIMENTS

To obtain an improved fish meal according to the present invention, one kilogram of ground fish, from which the easily-removed oil has been removed by cold pressing, is slurried with 100 grams of potassium hydroxide which has been dissolved in 0.1 liter water. A small amount, from about 2 to 5 ml of ethanol or other suitable material that is acceptable for use in food materials, is added to catalyze the hydrolysis reaction. This mixture is stirred for about one hour at room temperature and pressure. This hydrolysis also saponifies the fatty acids which are released from the membrane phospholipids. At this time, approximately one liter of 10% sulfuric acid is added to release the fatty acids as free fatty acids. The sulfuric acid concentration may range from about 5% to about 10%. An antioxidant may be added at this stage to maintain the sulfurcontaining amino acids present in their reduced state. A suitable antioxidant is ascorbyl palmitate, or vitamin C.

The free polyunsaturated fatty acids float to the top of the mixture to form a second, oily, phase on top of the aqueous phase, which contains proteins, potassium sulfate, and some bone minerals in the form of phosphates (principally as calcium phosphate and magnesium phosphate). Calcium chloride is added to this aqueous phase to remove the sulfur in the form of insoluble calcium sulfate. Perchloric acid is added to precipitate potassium as insoluble potassium perchlorate. The precipitated calcium sulfate and potassium perchlorate are removed from the aqueous phase, and the aqueous phase is dried in vacuo in provide a powdered protein product which is free of odor and oxidized fatty acids. The fatty acid content of this protein product is less than 0.1%, and the product is free of any fishy smell or taste.

Alternatively, the membrane phospholipids in the fish may be hydrolyzed without prior extraction of the easily extracted oils. In this case, additional alkaline material is required to hydrolyze the membrane phospholipids, as some of the alkaline material is used up in hydrolyzing the triglycerides present in the mixture.

The foregoing description of the specific embodiments will so fully reveal the general nature of the invention that others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology employed herein is for the purpose of description and not of limitation.

What is claimed is:

1. A process for recovering substantially oil-free fish meal, consisting essentially of the steps of:
    comminuting fish or fish by-products;
    hydrolyzing substantially all of the membrane phospholipids present in the fish or fish by-products at a temperature not substantially higher than ambient temperature, without use of organic solvent or using an organic solvent in an amount which is not greater than that sufficient to catalyze the hydrolysis;
    adding a strong acid to the reaction product of said hydrolyzing step to release free fatty acids from the mixture and to form an organic phase, containing free fatty acids, and an aqueous phase, containing dissolved proteins;
    removing said free fatty acids by separating the organic phase from the aqueous phase; and
    drying the aqueous phase to recover a substantially oil-free fish meal.

2. The process of claim 1, further including the step of removing the anion of the strong acid from the aqueous phase prior to said drying step.

3. The process of claim 2, wherein said strong acid is sulfuric acid and the sulfate anion is removed by adding a soluble calcium salt to the aqueous phase and removing the insoluble calcium sulfate.

4. The process of claim 3, wherein the soluble calcium salt is calcium chloride.

5. The process of claim 1, wherein said hydrolyzing step comprises treating the fish or fish-by-products with a sufficient amount of an aqueous alkaline material of sufficient alkalinity and for a sufficient time to cause hydrolysis of substantially all of the membrane phospholipids.

6. The process of claim 5, wherein said alkaline material is potassium hydroxide.

7. The process of claim 5, further including the step of removing the cation of said alkaline material from the aqueous phase prior to said drying step.

8. The process of claim 7, wherein said alkaline material is potassium hydroxide and the excess potassium ion is removed by addition of perchloric acid.

9. The process of claim 7, wherein said alkaline material from the aqueous phase in the potassium hydroxide and the excess potassium ion is removed by passing the aqueous phase through an appropriate ion exchange resin column.

10. The process of claim 5, wherein a catalytic amount of ethanol is added to the alkaline material and comminuted fish to catalyze the hydrolysis.

11. The process of claim 1, wherein said strong acid is sulfuric acid.

12. The process of claim 11, wherein an antioxidant is added along with the sulfuric acid.

13. The process of claim 12, wherein the antioxidant is ascorbic acid.

14. The process of claim 1, wherein the aqueous phase is dried in vacuo.

15. The process of claim 1, wherein the organic phase is separated from the aqueous phase by gravity separation.

16. The process of claim 1, wherein no temperature above 40° C. is used throughout said process.

17. The process of claim 1, wherein said hydrolyzing step is accomplished by means of a sufficient amount of phospholipase enzyme to hydrolyze substantially all of the membrane phospholipids present in the fish.

18. The process of claim 1, wherein said free fatty acids removed in said removing step are recovered.

19. A process in accordance with claim 1 wherein no organic solvent is used in said hydrolyzing step.

* * * * *